United States Patent
Murray

(10) Patent No.: US 11,441,515 B2
(45) Date of Patent: Sep. 13, 2022

(54) SOUND ABSORBER

(71) Applicant: ROLLS-ROYCE plc, London (GB)

(72) Inventor: Paul B. Murray, Horsham (GB)

(73) Assignee: ROLLS-ROYCE plc, London (GB)

( * ) Notice: Subject to any disclaimer, the term of this patent is extended or adjusted under 35 U.S.C. 154(b) by 440 days.

(21) Appl. No.: 16/572,885

(22) Filed: Sep. 17, 2019

(65) Prior Publication Data
US 2020/0141357 A1    May 7, 2020

(30) Foreign Application Priority Data

Oct. 8, 2018 (GB) ...................................... 1816335

(51) Int. Cl.
*F02K 1/82* (2006.01)
*F02C 7/045* (2006.01)
*G10K 11/162* (2006.01)

(52) U.S. Cl.
CPC .............. *F02K 1/827* (2013.01); *F02C 7/045* (2013.01); *G10K 11/162* (2013.01)

(58) Field of Classification Search
CPC ........ G10K 11/162; F02C 7/045; F02K 1/827
USPC ........................................ 181/202, 207, 208
See application file for complete search history.

(56) References Cited

U.S. PATENT DOCUMENTS

| | | | |
|---|---|---|---|
| 3,734,234 A | 5/1973 | Wirt | |
| 4,373,608 A * | 2/1983 | Holmes | G10K 11/172 181/202 |
| 4,749,150 A | 6/1988 | Rose et al. | |
| 8,869,933 B1 * | 10/2014 | McKnight | G10K 11/172 181/286 |
| 8,960,365 B2 * | 2/2015 | Sheng | G10K 11/16 181/207 |
| 9,303,588 B2 * | 4/2016 | Pongratz | G10K 11/172 |
| 2005/0189165 A1 * | 9/2005 | Mathur | G10K 11/175 181/207 |
| 2010/0116587 A1 | 5/2010 | Gantie et al. | |
| 2010/0212998 A1 | 8/2010 | Valleroy et al. | |
| 2010/0294882 A1 | 11/2010 | Gantie et al. | |
| 2010/0301161 A1 | 12/2010 | Chene et al. | |
| 2013/0186707 A1 | 7/2013 | Richter | |
| 2015/0027629 A1 | 1/2015 | Butler et al. | |
| 2015/0041248 A1 | 2/2015 | Ichihashi | |
| 2015/0047923 A1 * | 2/2015 | Chang | H03H 9/25 181/286 |

(Continued)

FOREIGN PATENT DOCUMENTS

| | | |
|---|---|---|
| EP | 2605238 | 6/2013 |
| EP | 2846030 | 11/2016 |

(Continued)

OTHER PUBLICATIONS

Great Britain search report dated Mar. 26, 2019, issued in GB Patent Application No. 1816335.2.

(Continued)

*Primary Examiner* — Forrest M Phillips
(74) *Attorney, Agent, or Firm* — Shumaker & Sieffert, P.A.

(57) ABSTRACT

A sound absorber for an engine of an aircraft, the sound absorber comprising: a base body having a bottom plate, a wall enclosing the bottom plate and an opening enabling entry of air into the base body; and a porous tongue having a fixed end connected to the wall and a free end; wherein the tongue is porous.

17 Claims, 7 Drawing Sheets

(56) References Cited

U.S. PATENT DOCUMENTS

2019/0035373 A1* 1/2019 Chunren .............. G10K 11/162
2020/0143784 A1* 5/2020 Huang ................. G10K 11/168

FOREIGN PATENT DOCUMENTS

EP 3534360 9/2019
GB 1594382 7/1981

OTHER PUBLICATIONS

European Search report dated Feb. 14, 2020, issued in EP patent application No. 19196095.

* cited by examiner

SOUND ABSORBER

CROSS-REFERENCE TO RELATED APPLICATIONS

This specification is based upon and claims the benefit of priority from United Kingdom patent application number GB 1816335.2 filed on Oct. 8, 2018, the entire contents of which are incorporated herein by reference.

BACKGROUND

Technical Field

The present disclosure relates to a sound absorber, a sound absorber assembly and an aircraft engine.

Description of the Related Art

Aircraft engines such as gas turbine engines produce noises. These noises can result in undesirable noise levels, on the ground around airports, and in the cabin. The noises can also contribute to noise pollution. U.S. Pat. No. 9,303,588 B2 discloses a sound absorber for reducing noise pollution and undesirable duct resonances.

United Kingdom patent application GB 1594382 A discloses a sound-attenuation or sound-insulating apparatus. The apparatus has an outer member and an inner member that define a gaseous flow duct. The space between the inner and outer members is divided along the length of the duct to form a plurality of substantially annular resonant cavities for attenuating noise in the duct by providing communication from the duct to the cavities through annular passages each extending into one of the cavities. Each annular passage defines two sections, one of which sections extends outwardly of the duct across the respective cavity and the other of which sections extends at an angle to the first-mentioned section. The entries to the passages lie flush with the inner surface of the inner member.

European patent application EP 2605238 A2 discloses an acoustic absorber. The absorber has a wall provided with orifices. The wall and a non-perforated wall are spaced apart from each other and a honeycomb structure is arranged between them. The honeycomb structure is provided in a region with a cylindrical recess. A funnel element is opened to the walls and arranged in the recess. The funnel element exhibits large height than a spacing of the walls. The non-perforated wall is formed in a region of the funnel element in a cup-shape. The funnel element is provided with an annular flange that lies lying against an inner side of the wall. The wall is designed as a perforated plate, a micro-perforated plate and a fabric.

It is an aim of the present disclosure to provide a sound absorber that is better at reducing noise pollution via design of a broadband attenuation spectrum or least provides a useful alternative to known sound absorbers.

SUMMARY

According to a first aspect there is provided a sound absorber for an engine of an aircraft, the sound absorber comprising: a base body having a bottom plate, a wall enclosing the bottom plate and an opening enabling entry of air into the base body; and a tongue having a fixed end connected to the wall and a free end; wherein the tongue is porous.

In an arrangement, the tongue has a normalized specific acoustic resistance not less than 0.5 ρc, preferably not less than 1.0 ρc, preferably not less than 2.0 ρc and preferably not less than 3.0 ρc, where ρ is the density of the air and c is the speed of sound through the air.

In an arrangement, the tongue has a normalized specific acoustic resistance not more than 40.0 ρc, preferably not more than 10.0 ρc, and preferably not more than 5.0 ρc, where ρ is the density of the air and c is the speed of sound through the air.

In an arrangement, the tongue has a central portion disposed between the fixed end and the free end, the tongue further having a longitudinal direction extending from the fixed end towards the free end, a width direction extending substantially perpendicularly to the longitudinal direction, and a transverse direction extending substantially perpendicularly to the longitudinal direction and substantially perpendicularly to the width direction, the central portion having a first free edge extending in the longitudinal direction from the fixed end towards the free end, and a second free edge opposite to the first free edge and extending in the longitudinal direction from the fixed end towards the free end.

In an arrangement, the tongue divides a space of the base body into a partial space adjacent to the bottom plate and a partial space adjacent to the opening, the two partial spaces being connected to each other via a gap, the free end being disposed at a first distance from the wall in the transverse direction and at a second distance from the bottom plate in the longitudinal direction, such that the first and the second distances determine a size of the gap.

In an arrangement, the central portion is configured to extend at least partially straight along the width direction.

In an arrangement, at least the central portion has two lateral portions extending in the longitudinal direction, with the lateral portions being connected with the wall.

According to a second aspect there is provided a sound absorber assembly for an engine of an aircraft, the sound absorber assembly comprising a plurality of the sound absorbers.

According to a third aspect there is provided a gas turbine engine for an aircraft comprising the sound absorber.

According to a fourth aspect there is provided a gas turbine engine for an aircraft comprising the sound absorber assembly.

In an arrangement, the gas turbine engine comprises:

an engine core comprising a turbine, a compressor, and a core shaft connecting the turbine to the compressor;

a fan located upstream of the engine core, the fan comprising a plurality of fan blades; and a gearbox that receives an input from the core shaft and outputs drive to the fan so as to drive the fan at a lower rotational speed than the core shaft.

In an arrangement, the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
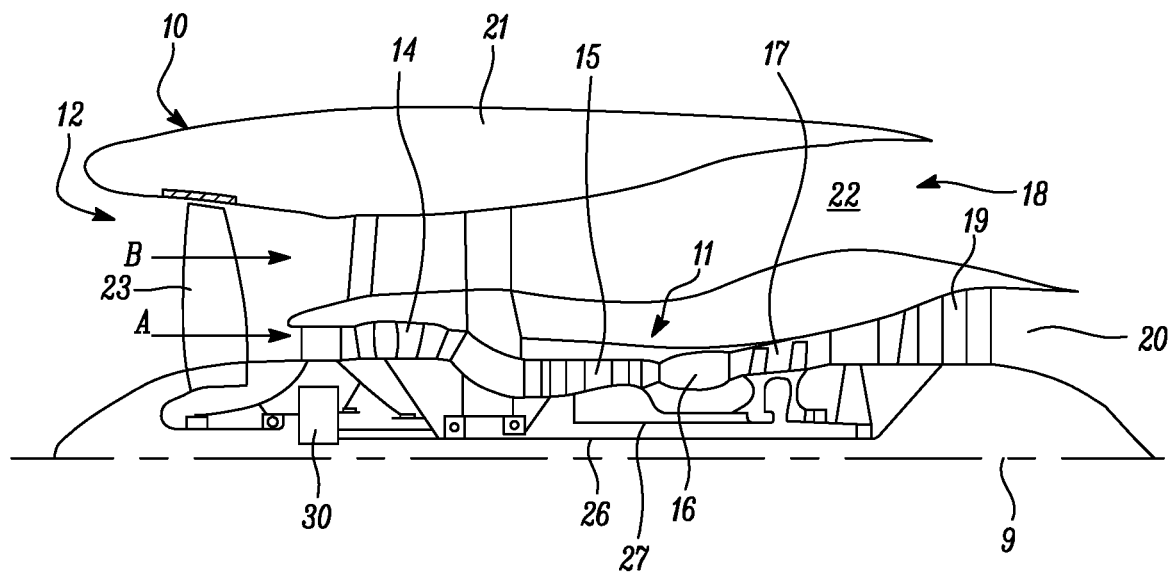
FIG. 1 is a sectional side view of a gas turbine engine.

Aspects and embodiments of the present disclosure will now be discussed with reference to the accompanying figures. Further aspects and embodiments will be apparent to those skilled in the art.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
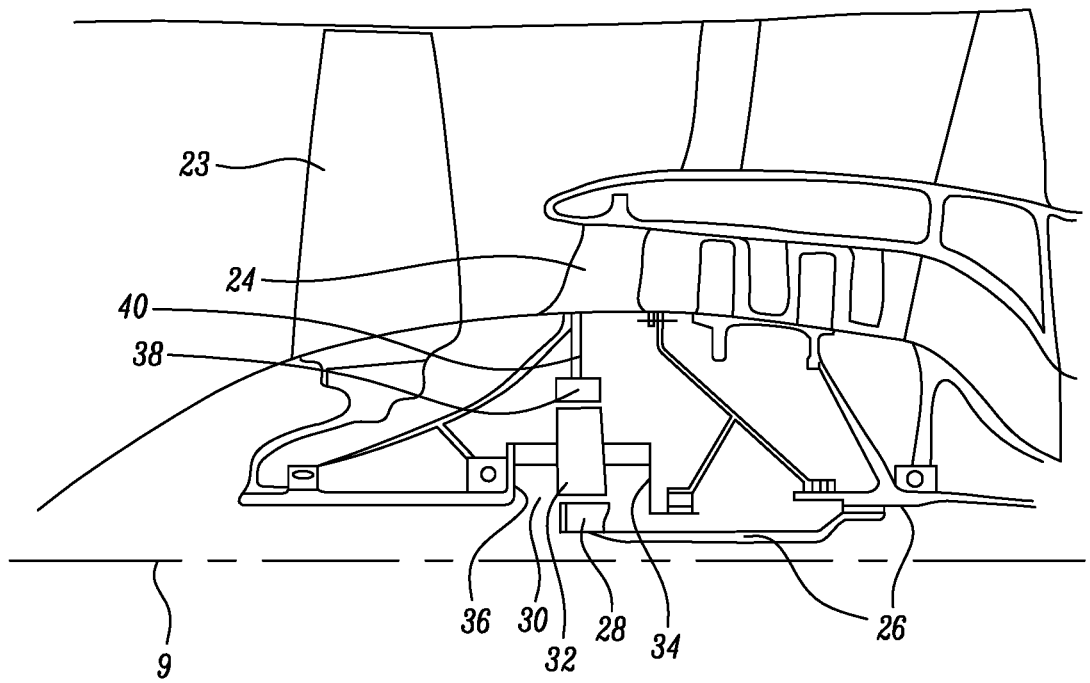
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
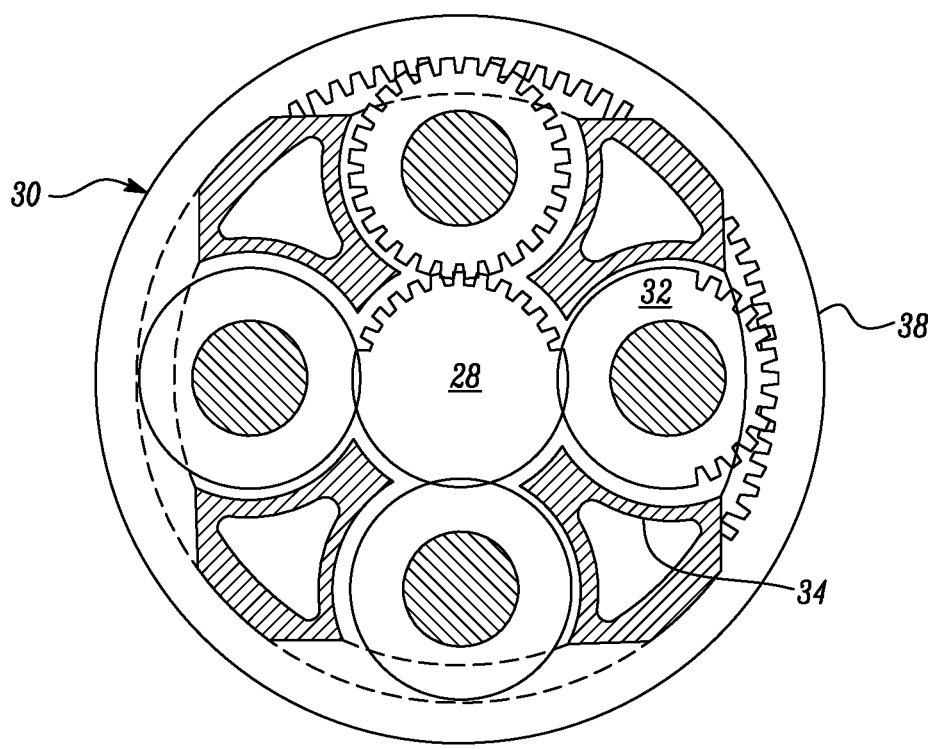
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
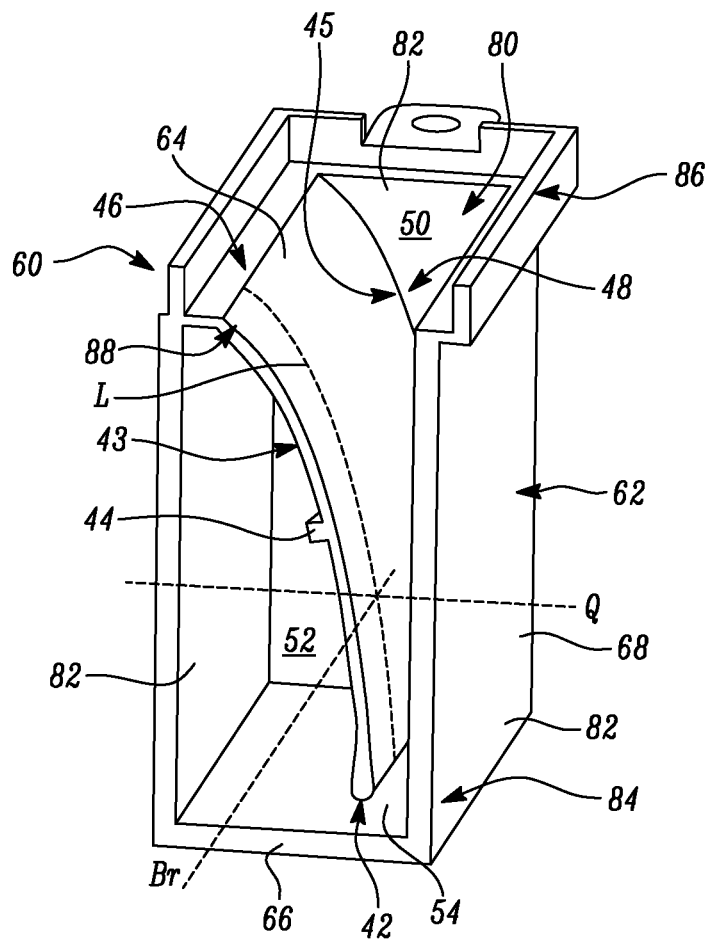
FIG. 4 shows a cross-section through a sound absorber according to the present disclosure.

FIG. 4 schematically depicts an arrangement of a sound absorber 60 according to the present disclosure. The sound absorber 60 is for an engine 10 of an aircraft. As shown in FIG. 4, the sound absorber 60 comprises a base body 62. The base body 62 has a bottom plate 66, a wall 68 and an opening 80. The wall 68 encloses the bottom plate 66.

As shown in FIG. 4, the sound absorber 60 comprises a tongue 64. The tongue 64 has a fixed end 88 and a free end 42. The fixed end 88 is connected to the wall 68.

The tongue 64 is porous. The sound absorber 60 according to the present disclosure is expected to be better at reducing noise pollution produced by the aircraft engine 10 compared to known sound absorbers. It has been discovered that the use of a porous tongue 64 in the sound absorber 60 makes the tongue 64 acoustically resistive. As a result, the performance of the sound absorber 60 is improved.

The sound absorber 60 according to the present disclosure is especially useful for an engine 10 that has a high bypass ratio. Nevertheless, the sound absorber 60 can be used to reduce engine noise in any aircraft.

By providing that the tongue 64 is porous, the mass of the sound absorber 60 is reduced. This improves the specific fuel combustion, energy efficiency and environmental impact of the engine 10.

In an arrangement, where the facing sheet specific acoustic resistance is 1.2 ρc, the tongue 64 has a normalized specific acoustic resistance not less than 0.5 ρc, where the absolute specific acoustic resistance is normalized by the product ρc, where ρ is the density of the air (which enters into the base body 62) and c is the speed of sound through the air. By providing that the normalized specific acoustic resistance is not less than 0.5 ρc, the acoustic resistance of the tongue 64 can significantly dampen out anti-resonances. This is explained in more detail with reference to FIG. 8. It is noted that the effect of the tongue resistance holds for varying values of facing sheet resistance.

Figure 8:
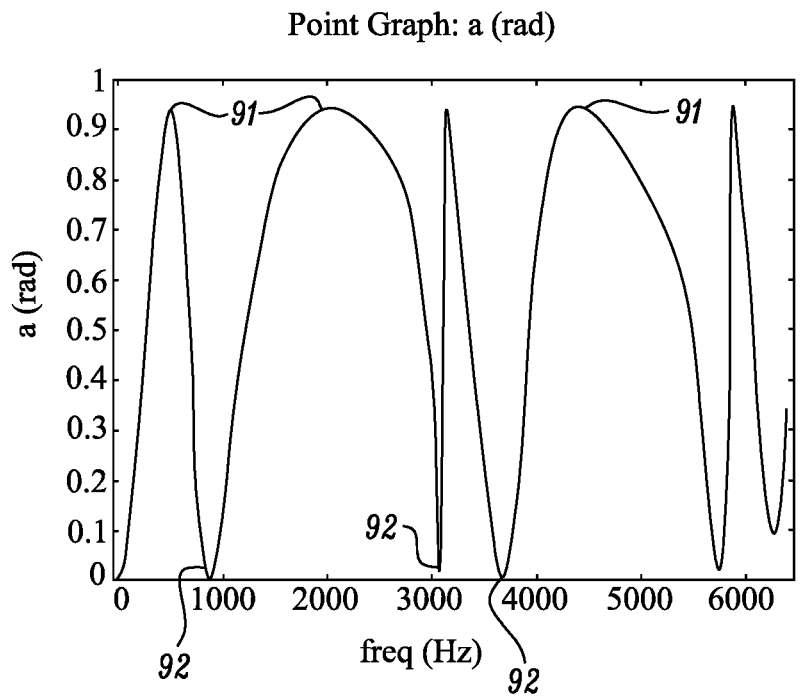
FIG. 8 is a graft showing the relationship between frequency and absorption by a sound absorber according to a comparative example.

FIG. 8 is a graph showing the relationship between frequency (along the x axis) and absorption (along the y axis) by a sound absorber according to a comparative example. The comparative example is a sound absorber with a facing sheet resistance of 1.2 ρc in which the non-porous tongue forms a hard wall partition.

As shown in FIG. 8, the absorption spectrum includes low frequency absorption maxima 91. However, these low frequency absorption maxima are accompanied by undesirable minima 92. At the frequencies corresponding to the minima, the sound absorber of the comparative example has a poor performance. This can lead to noise pollution.

According to the present disclosure, by making the tongue 64 porous, the acoustic resistance in the tongue 64 improves absorption particularly at the frequencies corresponding to the minima shown in FIG. 8.

Figure 9:
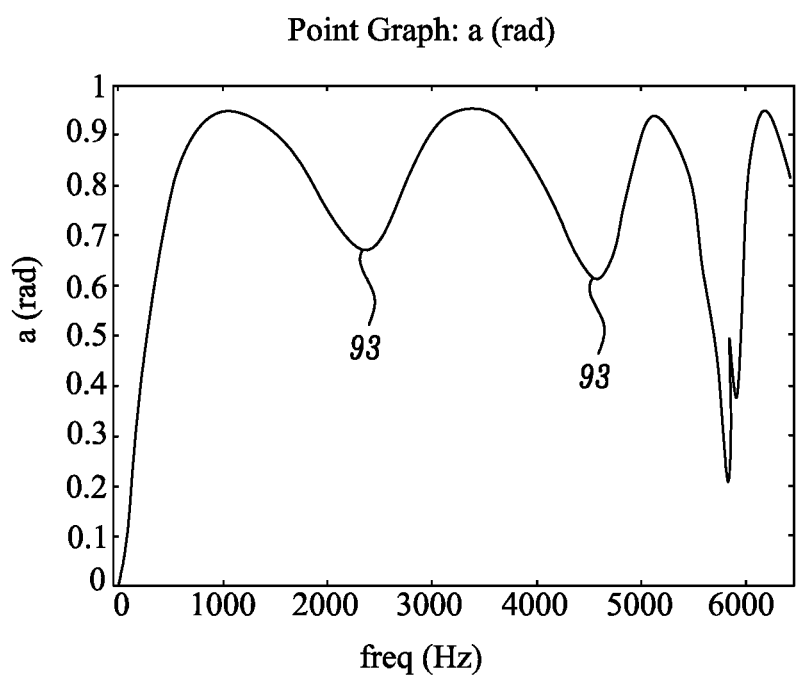
FIGS. 9 to 11 are graphs showing the relationship between frequency and absorption by a sound absorber of alternative arrangements according to the present disclosure.

In an arrangement, the tongue 64 has a normalized specific acoustic resistance not less than 1.0 ρc. FIG. 9 is a graph showing the relationship between frequency and absorption by a sound absorber 60 according to the present disclosure. In particular, FIG. 9 shows the absorption spectrum for a sound absorber 60 that has a normalized specific acoustic resistance of 1.0 ρc.

As shown in FIG. 9, the absorption minima 93 are greatly increased (compared to the minima 92 shown in FIG. 8). This is because of the acoustically resistive tongue 64.

In an arrangement, the tongue 64 has a normalized specific acoustic resistance not less than 2.0 ρc. By providing that the tongue 64 has a normalized specific acoustic resistance not less than 2.0 ρc, the absorption at the minima 93 shown in FIG. 9 is further increased.

Figure 10:
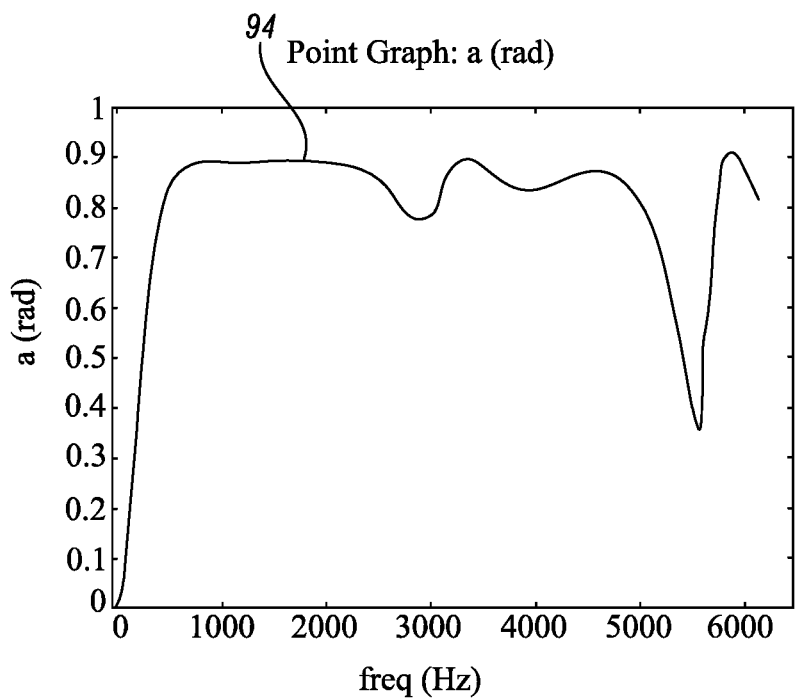

In an arrangement, the tongue 64 has a normalized specific acoustic resistance not less than 5.0 ρc. FIG. 10 is a graph showing the relationship between frequency and absorption for a sound absorber 60 according to the present disclosure. In particular, FIG. 10 shows the absorption spectrum for a sound absorber 60 which has a normalized specific acoustic resistance of 5.0 ρc. As shown in FIG. 10, particularly section 94 of the spectrum, the absorption is more broadband (compared to the sound absorbers with lower acoustic resistance as shown in FIGS. 8 and 9).

By comparing FIGS. 8, 9 and 10, it can be seen that improved sound absorption is correlated with increasing specific acoustic resistance (reducing porosity) of the tongue 64.

Figure 11:
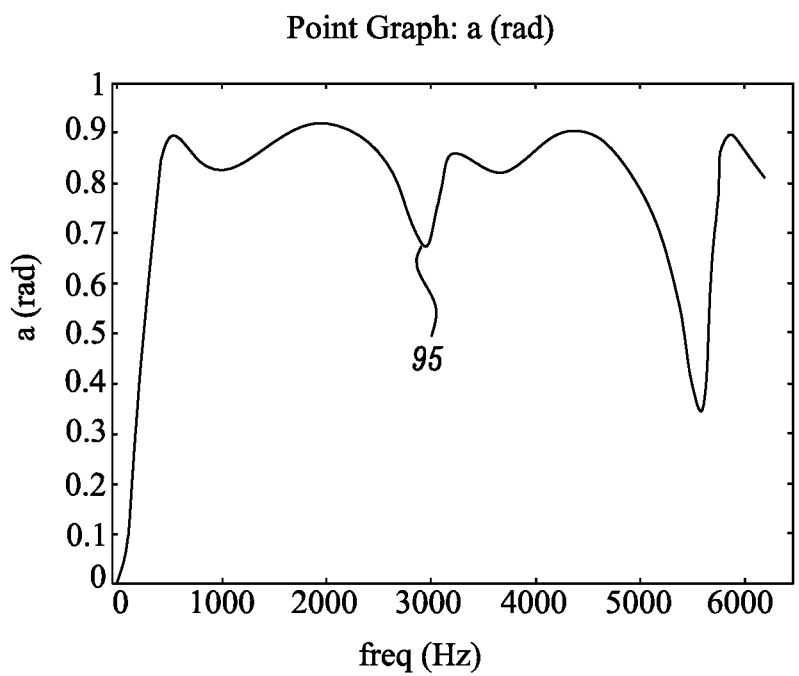

In an arrangement, the tongue 64 has a specific normalized specific acoustic resistance not more than 10.0 ρc. FIG. 11 is a graph showing the relationship between frequency and absorption for a sound absorber 60 according to the present disclosure. In particular, FIG. 11 shows the absorption spectrum for a sound absorber 10 having a normalized specific acoustic resistance of 10.0 ρc. As shown in the minimum 95 of FIG. 11, the absorption is degraded when compared to the spectrum shown in FIG. 10. This shows that although improved sound absorption is initially correlated with increasing tongue resistance, after a point the sound absorption beings to diminish. By providing that the tongue 64 has a normalized specific acoustic resistance not more than 10.0 ρc, the absorption is prevented from degrading beyond the spectrum shown in FIG. 11.

In an arrangement, the tongue 64 has a specific acoustic resistance not more than 5.0 ρc. By providing that the tongue 64 has a specific acoustic resistance not more than 5.0 ρc, the tongue 64 helps to dampen out anti-resonances relative to a sound absorber with a non-porous tongue, without the porosity of the tongue 64 degrading the absorption.

The absolute acoustic resistance of the sound absorber 60 depends on the density of the air and the speed of sound through the air. Merely as an example, at a temperature of 15° C. the speed of sound through the air may be 340.27 m/s and the density of air may be 1.225 kg/m³. At these values, 1.0 ρc=341.495 Pa·s/m, 2.0 ρc=682.99 Pa·s/m, 5.0 ρc=1707.475 Pa·s/m and 10.0 ρc=3414.95 Pa·s/m.

Further optional features of the sound absorber 60 are described below.

Figure 5:
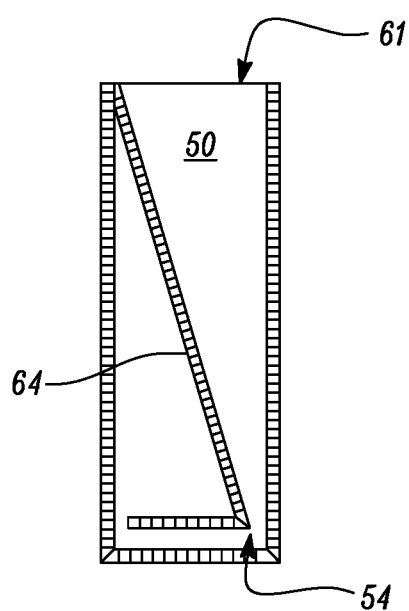
FIG. 5 is a schematic depiction of an alternative arrangement for a sound absorber according to the present disclosure.
Figure 6:
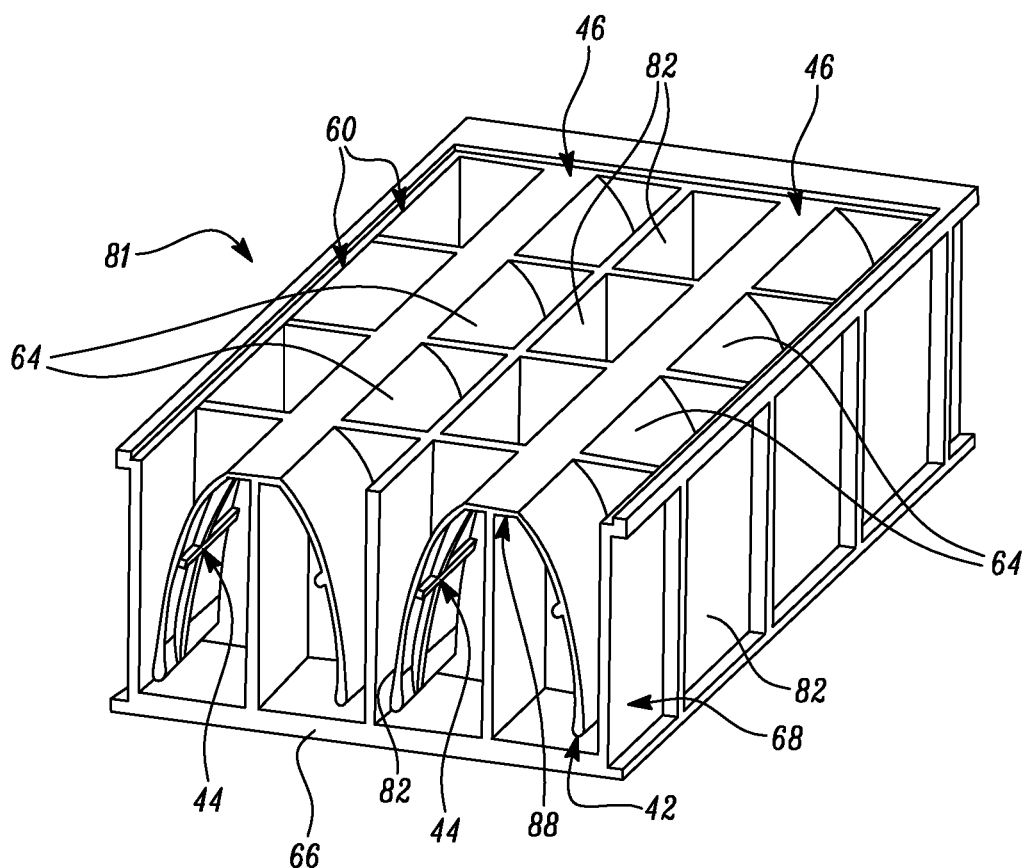
FIG. 6 shows a cross-section through a sound absorber assembly according to the present disclosure.
Figure 7:
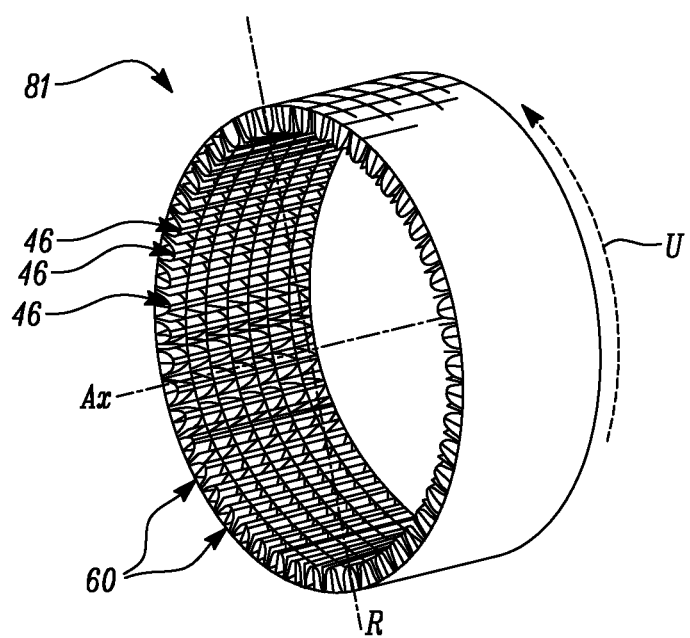
FIG. 7 shows a side view of an alternative arrangement for a sound absorber assembly according to the present disclosure.

FIGS. 4 and 5 schematically depict alternative arrangements of a sound absorber 60 according to the present disclosure. FIGS. 6 and 7 schematically depict alternative arrangements of a sound absorber assembly 81 according to the present disclosure.

The sound absorber assembly 81 may be disposed in an exhaust cone of the engine 10. Alternatively, the sound absorber assembly 81 can be disposed in one or more of the air intake 12, the bypass duct 22, the mixed flow nozzle and the engine core 11. The sound absorber assembly 18 is provided particularly if a low-frequency absorption of the noise produced in the engine 10 is desired.

The sound absorber assembly 81 is composed of several sound absorbers 60. The sound absorber 60 has a base body 62 and a tongue 64. The base body 62 has a bottom plate 66, a wall 68 and an opening 80. Furthermore, the sound absorber 60 has a covering layer 61 disposed in the region of the opening 80. The covering layer 61 is drawn in only in FIG. 5. The covering layer 61 is made from an air-permeable material and consists, for example, of a perforated metal, a μ-perforated metal and/or a metal fabric.

In an arrangement, the bottom plate 66 is rectangular. The wall 68 is composed of four side walls 82 that each contact one side of the bottom plate 66. A first edge portion 84 of the wall encloses the bottom plate 66, while a second edge portion 86 surrounds the opening 80. The opening 80 and the bottom plate 66 are disposed opposite from each other, with the distance of the opening 80 and the bottom plate 66 being determined by the wall 68.

The tongue 64 has a fixed end 88, a central portion 43 and a free end 42. The central portion 43 is disposed between the fixed end 88 and the free end 42. A longitudinal direction L extends from the fixed end 88 to the free end 42. A transverse direction Q and a width direction Br are disposed perpendicular thereto. In an arrangement, the tongue 64 is reinforced by struts 44. Along the longitudinal direction L, the tongue 64 has lateral portions 45 that contact side walls 82 of the wall 68 spaced apart in the width direction Br. The lateral portions 45 extend over the entire length of the tongue 64. The lateral portions 45 are connected in an air-tight manner to the contacting side walls 82 by welding.

The tongue 64 is attached to the wall 68 via an attachment portion 46. The free end 42 is spaced in the transverse direction Q from a side wall 82 of the wall 68. The free end 42 is spaced in the longitudinal direction L from the bottom plate 66 by a second distance.

In an arrangement, the tongue 64 is bent along the longitudinal direction L in the shape of a parabola branch, whereas it is straight in the width direction Br. In an arrangement, the tongue 64 is made from sheet metal.

The base body 62 delimits a half-space 48, which is connected to the surroundings of the sound absorber 60 via the opening 80. The half-space 48 is divided by the tongue 64 into a first partial space 50 adjacent to the opening 80 and a second partial space 52 adjacent to the bottom plate 66. The partial spaces 50 and 52 are connected to each other via a gap 54. The gap 54 is formed by the free end 42 and the base body 62; that means that the extent of the gap 54 is determined by the first distance and the second distance.

The size of the gap 54 is determined by the shape and the length of the tongue 64. In particular the shape of the free end 42 is a decisive factor for the extent of the gap 54. In an arrangement, the free end 42 can be bent away from the side wall 82 that is closest to the free end 42 in the transverse direction Q. In this case, the curvature can be arcuate or acute-angled. Alternatively, the free end 42 may not have a curvature or be thickened at the end thereof.

The attachment portion 46 can protrude into the opening 80 to different extents; that means that the surface of the attachment portion 46 in the plane of the opening 80 can be configured differently. As is shown in FIG. 6, the attachment portion 46 can be used for attaching several tongues 64. In particular, the tongues 64 of two adjacent base bodies are disposed on a single attachment portion 46.

The sound absorber assemblies 18 shown in FIGS. 6 and 7 have base bodies 62 whose walls 68 contact each other. The side walls 82 of the walls 68 contacting each other are provided by a side wall 82, so that it is not two side walls 82 that are disposed so as to contact each other, whereby weight can be saved. This constitutes an example of a common wall. The walls 68 of the sound absorber assembly 81 thus form a honeycomb structure.

The sound absorber assembly 81 can extend in a plane, as shown in FIG. 6, or have the shape of a ring, as shown in FIG. 7. In the sound absorber assembly 81 shown in FIG. 6, which extends in a plane, the walls 68 are disposed perpendicular to the bottom plate 66. In this case, the bottom plate 66 can be a single-piece member for the individual sound absorbers 60. A perpendicular arrangement of the wall 68 relative to the bottom plate 66 is advantageous in that the openings 80 cover the surface of the sound absorber assembly 81 without any interruptions. This makes possible a particularly high degree of efficiency of the sound absorber assembly 81 because a particularly large amount of sound is able to enter the sound absorber 60 through the openings 80.

In the case of a ring-shaped arrangement of the sound absorber assembly 81 as it is used, for example, in the engine 10, the wall 68 is disposed at an angle of less than 90° relative to the bottom plate 66, so that the base body 62 is conical. In this case, the side walls 82 extending in a circumferential direction U are disposed perpendicular to the bottom plate 66, whereas the side walls 82 disposed perpendicular to an axial direction Ax are inclined at an angle of less than 90° relative to the bottom plate 66.

The openings 80 of the individual sound absorbers 60 of the sound absorber assembly 81 are disposed inwards in the radial direction R. The attachment portion 46 is disposed in the axial direction Ax, whereas alternatively the attachment portion 46 may be disposed in the circumferential direction U. Tongues 64 that are inserted into the half-space 48 of the base body 62 are attached to each of the two sides of the attachment portion 46.

The present disclosure provides an improved broadband sound absorber 60. The sound absorber 60 is suitable for reducing the audible engine noise from a variety of gas turbine aircraft engines 10. The sound absorber 60 may be particularly useful for high bypass ratio turbofan engines. This is because the large rotating fans generate more noise than small rotating fans. Additionally, the acoustically lined length to diameter ratio is lower for these large engines, which drives the requirement for more efficient sound absorption.

The sound absorption properties of the sound absorber 60 can be tuned by adjusting the porosity of the tongue 64. In particular, the porosity of the material of the tongue 64 can be selected as to provide the desired sound absorption spectrum. The material for the tongue 64 is not particularly limited, provided that it is porous. For example, in an arrangement the material is a foam or fiber filling. The tongue may be formed of perforated aluminum or CFC, which may be punched, laser drilled, or mechanically drilled, for example.

Figure 12:
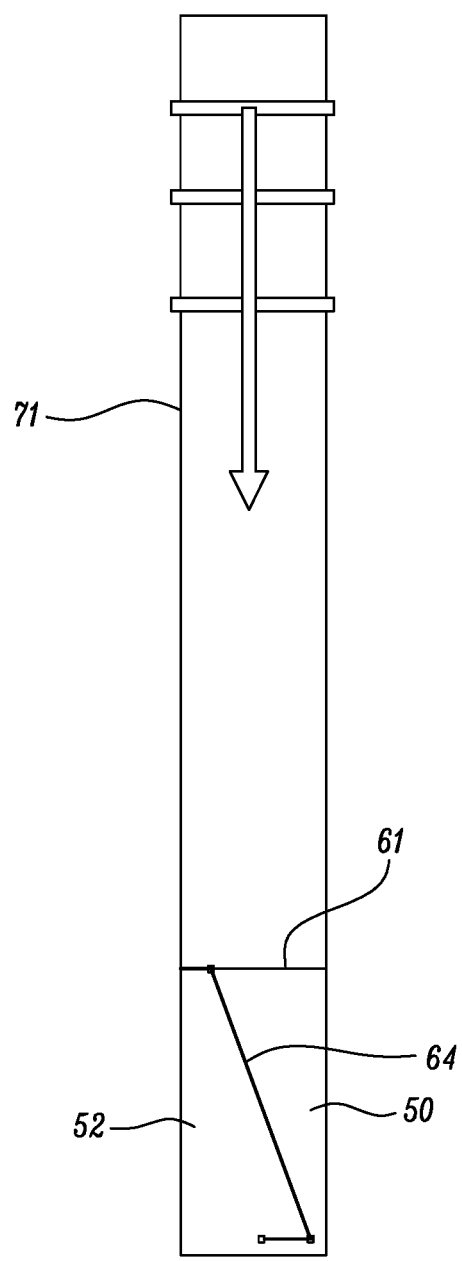
FIG. 12 is a schematic depiction of a model for measuring the relationship between frequency and absorption by a sound absorber.

FIG. 12 schematically depicts a model for measuring the absorption spectra illustrated in FIGS. 8 to 11. As shown in FIG. 12, the model comprises an impedance tube 71 adjacent to the covering layer 61 and the tongue 64 that partitions the space 52. A computer simulation of this model has been used to determine the effect of acoustic resistance of the tongue 64 on the absorption spectra.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A sound absorber for an engine of an aircraft, the sound absorber comprising:

a base body having a bottom plate, a wall enclosing the bottom plate and an opening enabling entry of air into the base body; and a tongue having a fixed end connected to the wall and a free end;

wherein the tongue is porous, and wherein the tongue has a normalised specific acoustic resistance not less than 0.5 ρc and not more than 10.0 ρc, where ρ is the density of the air and c is the speed of sound through the air.

2. The sound absorber of claim 1, wherein the tongue has a normalised specific acoustic resistance not less than 1.0 ρc, where ρ is the density of the air and c is the speed of sound through the air.

3. The sound absorber of claim 1, wherein the tongue has a normalised specific acoustic resistance not less than 2.0 ρc, where ρ is the density of the air and c is the speed of sound through the air.

4. The sound absorber of claim 1, wherein the tongue has a normalised specific acoustic resistance not less than 3.0 ρc, where ρ is the density of the air and c is the speed of sound through the air.

5. The sound absorber of claim 1, wherein the tongue has a normalised specific acoustic resistance not more than 5.0 ρc, where ρ is the density of the air and c is the speed of sound through the air.

6. The sound absorber of claim 1, wherein the tongue has a central portion disposed between the fixed end and the free end, the tongue further having a longitudinal direction (L) extending from the fixed end towards the free end, a width direction (Br) extending substantially perpendicularly to the longitudinal direction (L), and a transverse direction (Q) extending substantially perpendicularly to the longitudinal direction (L) and substantially perpendicularly to the width direction (Br), the central portion having a first free edge extending in the longitudinal direction (L) from the fixed end towards the free end, and a second free edge opposite to the first free edge and extending in the longitudinal direction (L) from the fixed end towards the free end.

7. The sound absorber of claim 6, wherein the tongue divides a space of the base body into a partial space adjacent to the bottom plate and a partial space adjacent to the opening, the two partial spaces being connected to each other via a gap, the free end being disposed at a first distance from the wall in the transverse direction (Q) and at a second distance from the bottom plate in the longitudinal direction (L), such that the first and the second distances determine a size of the gap.

8. The sound absorber of claim 6, wherein the central portion is configured to extend at least partially straight along the width direction.

9. The sound absorber of claim 1, wherein at least the central portion has two lateral portions extending in the longitudinal direction, with the lateral portions being connected with the wall.

10. A sound absorber assembly for an engine of an aircraft, the sound absorber assembly comprising a plurality of sound absorbers of claim 1.

11. A gas turbine engine for an aircraft comprising the sound absorber of claim 1.

12. A gas turbine engine for an aircraft comprising the sound absorber assembly of claim 10.

13. The gas turbine engine of claim 11, comprising:

an engine core comprising a turbine, a compressor, and a core shaft connecting the turbine to the compressor;

a fan located upstream of the engine core, the fan comprising a plurality of fan blades; and a gearbox that receives an input from the core shaft and outputs drive to the fan so as to drive the fan at a lower rotational speed than the core shaft.

14. The gas turbine engine according to claim 13, wherein:
   the turbine is a first turbine, the compressor is a first compressor, and the core shaft is a first core shaft;
   the engine core further comprises a second turbine, a second compressor, and a second core shaft connecting the second turbine to the second compressor; and
   the second turbine, second compressor, and second core shaft are arranged to rotate at a higher rotational speed than the first core shaft.

15. A sound absorber for an engine of an aircraft, the sound absorber comprising:
   a base body having a bottom plate, a wall enclosing the bottom plate and an opening enabling entry of air into the base body; and
   a porous tongue having a fixed end connected to the wall and a free end, wherein the tongue is bent along a longitudinal direction in an arcuate shape and wherein the tongue has a normalised specific acoustic resistance not less than 0.5 $\rho c$ and not more than 10.0 $\rho c$, where $\rho$ is the density of the air and c is the speed of sound through the air.

16. The sound absorber of claim 15, wherein the tongue has the shape of a branch of a parabola in the longitudinal direction, and wherein the tongue is straight in a width direction substantially perpendicular to the longitudinal direction.

17. The sound absorber of claim 16, wherein the tongue comprises a foam or a fiber filling.

* * * * *